United States Patent
Carpenter, Jr.

(10) Patent No.: US 9,783,441 B2
(45) Date of Patent: Oct. 10, 2017

(54) WASTEWATER TREATMENT SYSTEM HAVING FLOW PORTS FOR MODULATING FLOW

(71) Applicant: Clear Environment LLC, Fair Oaks, CA (US)

(72) Inventor: William Neil Carpenter, Jr., Auburn, CA (US)

(*) Notice: Subject to any disclaimer, the term of this patent is extended or adjusted under 35 U.S.C. 154(b) by 0 days.

(21) Appl. No.: 14/306,777

(22) Filed: Jun. 17, 2014

(65) Prior Publication Data
US 2017/0015575 A1 Jan. 19, 2017

Related U.S. Application Data

(60) Provisional application No. 61/836,586, filed on Jun. 18, 2013.

(51) Int. Cl.
*C02F 3/30* (2006.01)
*C02F 3/12* (2006.01)
*C02F 3/00* (2006.01)

(52) U.S. Cl.
CPC ......... *C02F 3/1247* (2013.01); *C02F 3/006* (2013.01); *C02F 3/302* (2013.01); *C02F 2203/006* (2013.01); *Y02W 10/15* (2015.05)

(58) Field of Classification Search
CPC ......... C02F 3/30; C02F 1/00; C02F 2301/04; C02F 2203/006; C02F 2001/007
USPC ............ 210/605, 630, 252, 259, 903, 921
See application file for complete search history.

(56) References Cited

U.S. PATENT DOCUMENTS

| | | | |
|---|---|---|---|
| 4,882,046 A | | 11/1989 | Waite |
| 5,064,175 A | * | 11/1991 | Soofi ............... B22D 11/119 266/229 |
| 5,409,604 A | * | 4/1995 | Graves ............. B01D 21/0012 210/109 |
| 7,341,660 B1 | | 3/2008 | Guy et al. |
| 7,674,372 B2 | | 3/2010 | Graves |
| 2014/0076800 A1 | * | 3/2014 | Graves ................... C02F 9/00 210/605 |

* cited by examiner

*Primary Examiner* — Fred Prince (57) ABSTRACT

A system and a method comprise an upstream chamber is configured to receive a variable input flow of a wastewater mixture having a maximum input flow rate. A downstream chamber is adjacent to the upstream chamber. An effluent baffle wall separates the downstream chamber from the upstream chamber. An effluent flow port is located in the effluent baffle wall. The effluent flow port comprises a first orifice configured to produce a first modulated flow of the wastewater mixture from the upstream chamber to the downstream chamber, and a second orifice being positioned above the first orifice. The second orifice is configured to produce a second modulated flow having a second flow rate, wherein a combined flow rate including the first and second flow rates is less than the maximum input flow rate.

6 Claims, 6 Drawing Sheets

WASTEWATER TREATMENT SYSTEM HAVING FLOW PORTS FOR MODULATING FLOW

CROSS-REFERENCE TO RELATED APPLICATIONS

The present Utility patent application claims priority benefit of the U.S. provisional application for patent Ser. No. 61/836,586 titled "WASTEWATER TREATMENT SYSTEM HAVING FLOW PORTS FOR MODULATING FLOW", filed on Jun. 18, 2013, under 35 U.S.C. 119(e). The contents of this related provisional application are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

This application relates generally to a system and method of treating wastewater and, more specifically, to a multi-chamber wastewater treatment system having flow ports for modulating flow between chambers.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Wastewater treatment and water reclamation are increasingly important aspects of urban planning and residential development. As population densities increase and new housing developments spread, existing municipal treatment systems may become strained. In some cases, processing capacity provided by existing municipal treatment systems may even hinder or constrain new residential development projects or urban growth. Moreover, providing and maintaining clean water resources are also increasingly important given the demands that growing populations place on existing fresh water supplies.

In an effort to reduce the strain on municipal wastewater processing facilities and simultaneously address water shortages, it may be advantageous for local government agencies and individuals to reclaim wastewater on-site at a residential level. In particular, wastewater produced by a household can be reclaimed for use in irrigation, flushing toilets, or other applications that may not require purified drinking water. Reclaiming even a modest percentage of wastewater has the potential to have a significant impact on fresh water resources.

By way of educational background, another aspect of the prior art generally useful to be aware of is that a traditional alternative to municipal wastewater treatment systems is to use a residential septic tank system. However, many traditional septic tank systems typically have a limited ability to accommodate even a temporary high inflow of wastewater. For example, if the flow rate of wastewater into some traditional septic tanks is too high, the system may become flooded resulting in the release of scum and sludge into the effluent flow. If the effluent is dispersed into a leach field, the scum and sludge may cause the leach field to clog and the system to eventually fail.

By way of educational background, another aspect of the prior art generally useful to be aware of is that deficiencies in traditional systems may be attributed, at least in part, to poorly managed wastewater transfer between tanks or chambers. In some traditional systems, wastewater is transferred between tanks or chambers via a waterfall or cascade of waterfalls. In other traditional systems, a sanitary tee joint is used to transfer wastewater between tanks or chambers. In a sanitary tee joint, a vertical tube (e.g., 4 inch diameter pipe section) is connected to the middle of a horizontal tube (e.g., 4 inch diameter pipe section) to form a tee joint. One end of the horizontal tube serves as the intake from a first chamber. Fluid from the first chamber enters the intake and flows out of the bottom of the vertical tube, which is submerged in the liquid of the adjacent recipient chamber.

By way of educational background, another aspect of the prior art generally useful to be aware of is that in some traditional septic tank systems, liquid transfer between tanks or chambers may largely be determined by the input to the tank system. For example, for systems with a waterfall type transfer, large input flows may cause fluid to rapidly cascade into downstream chambers at a rate that is substantially equal to the rate of the input flow. Similarly, systems that use a traditional sanitary-tee joint allow fluids to transfer between chambers at a rate that is substantially equal to the input flow rate. Using either traditional fluid transfer technique, a large input flow of wastewater may cause the wastewater to spend too little time being processed within the system before being flushed out as effluent. Additionally, large variations in the input flow rate may result in large variations in the quality of the processing that is achieved by traditional systems. Thus, it is believed, traditional systems with poorly managed fluid transfer may be vulnerable to overloading based on input volume sensitivity, which may in turn lead to inconsistent and potentially insufficient wastewater processing.

Accordingly, a wastewater treatment system that can accommodate varying input volume while modulating fluid transfer between chambers to facilitate effective processing is desired.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/ dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

As previously mentioned, in some traditional septic tank systems, liquid transfer between tanks or chambers is highly dependent on the flow rate of the input to the tank system. If the input flow rate is too large in a traditional system, fluids may be transferred through the system too quickly, resulting in insufficient or incomplete processing. Thus, traditional septic tank systems having poorly managed fluid transfer may be vulnerable to overloading, which may result in insufficient wastewater processing or system failure due to the presence of sludge and solids in the output flow.

Embodiments of the present invention illustrate systems, means and methods for wastewater reclamation and treatment that may be implemented on-site at the residential level. In many embodiments, decentralized, on-site systems may be used to capture, process, and reuse wastewater without an expensive municipal sewage infrastructure or centralized water treatment facility. In some embodiments, decentralized, on-site systems may be incrementally added to provide increased wastewater treatment capacity without requiring a significant capital investment.

Embodiments of the wastewater treatment system and methods described herein may be used to address deficiencies in some traditional septic tank systems. In particular, wastewater treatment may be performed using a multi-chamber wastewater treatment system having one or more passive flow ports to modulate internal flow. For purposes of the following discussion, a wastewater treatment process may be characterized as a two-tier treatment process. The first tier may include, without limitation, processes that are generally less sensitive to changes in flow rate and a second tier may include, without limitation, processes that are generally more sensitive to changes in flow rate.

In one example, a multi-chamber system is configured to accommodate a varying input flow rate for first tier processing in upstream chambers while protecting downstream chambers from variable flows that may be disruptive to downstream second tier processing. In some cases, the first tier of processing includes, without limitation, upstream processes that break down large solid waste in suboxic and anaerobic processes. The first tier of processing may accommodate relatively large changes in the flow rate of the wastewater input because the suboxic and anaerobic processes are generally less sensitive to changes in flow rate and mixture concentration. In contrast, the second tier of processing may involve aerobic digestion and/or settling processes, which may be performed more effectively under steady flow conditions. Accordingly, the aerobic digestion performed in the second tier of processing may be much more sensitive to changes in flow rate that could be caused by a sudden influx of wastewater. Additionally, by protecting the second tier of processing from disruptive inflows, it may be easier to maintain a calm, quiescent state in some downstream chambers, allowing remaining suspended solids to settle.

Figure 1A:
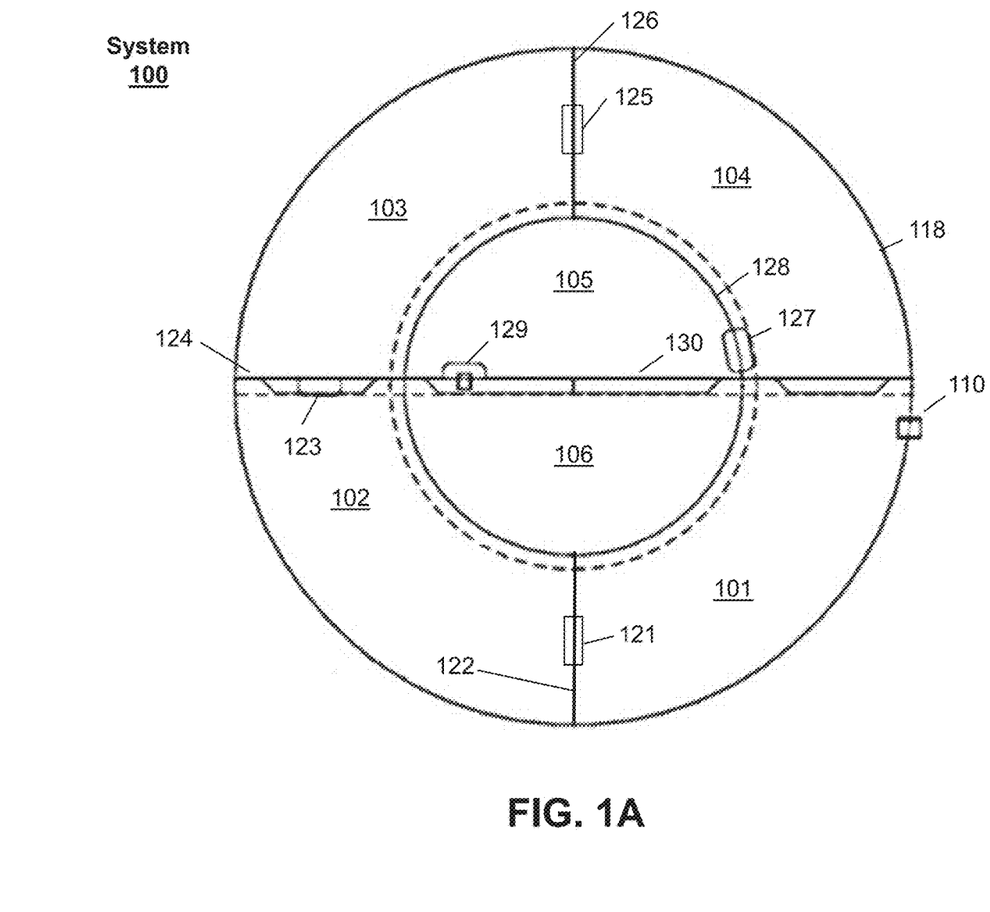
FIG. 1A depicts a plan view of an exemplary wastewater treatment system.
Figure 1B:
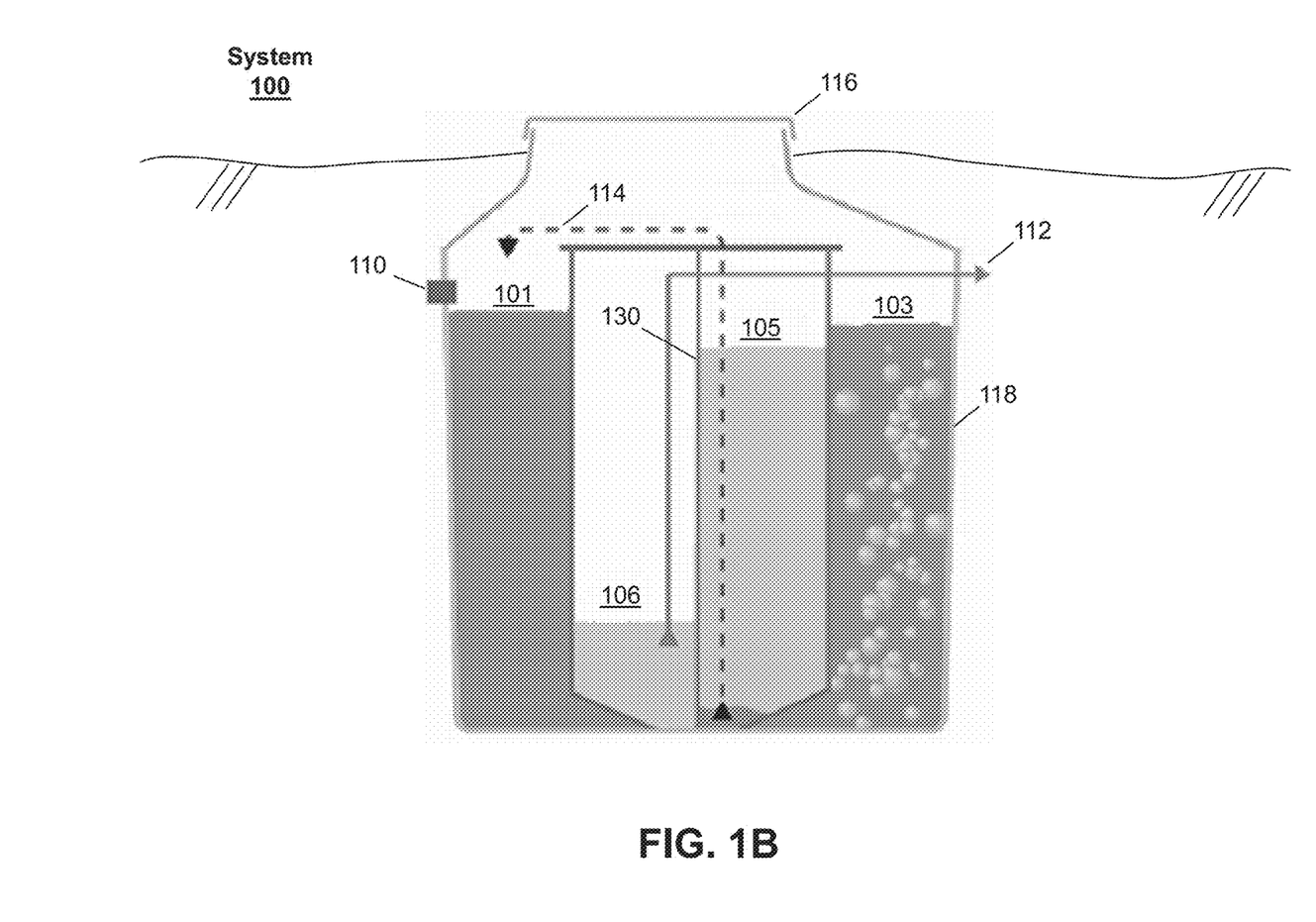
FIG. 1B depicts an elevation view of an exemplary wastewater treatment system.

FIGS. 1A-B depict an exemplary multi-chambers wastewater treatment system 100 that can be generally characterized as a two-tier processing system. As shown in FIG. 1A, system 100 includes, without limitation, six successive chambers for successively processing wastewater, including chambers 101, 102, 103, 104, 105, and 106. The six chambers of system 100 are housed in cylindrical housing 118, which is configured for in-ground or above-ground installation at a location that collects human or animal sewage. As shown in FIG. 1B, the chambers and interior components of the system 100 can be accessed via removable cover 116.

Components of system 100 discussed herein may be constructed from a variety of different materials. For example, without limitation, chamber walls, baffle walls, weir guards, covers, and the like may be constructed from chemical-resistant and UV stabilized isophthalic polyester resin that may be bonded with heavyweight woven fiberglass matte and glass fibers. The structures may be puncture resistant, watertight, crush proof, crack proof, durable, and lightweight. Other suitable materials include, without limitation, thermoplastics, reinforced plastic blends, composite materials, concrete, and the like.

In this example, processing performed in the first and second chambers (101 and 102) can be generally characterized as a first tier of processing. As shown in FIGS. 1A-B, the first chamber 101 is configured to receive a wastewater mixture (including a mixture of water and biomass) through inlet conduit 110. In this example, the inlet conduit 110 is configured for connection to the output of a wastewater plumbing system. A typical waste plumbing system may include, without limitation, a system of 2-½ inch pipes routed to a single 4-inch output pipe. In some cases, the total flow produced by the wastewater plumbing system is determined, at least in part, by the diameter of the pipes used to route the wastewater to the output pipe. In some cases, the total flow produced by the wastewater plumbing system is limited by another flow-restricting element or device within the wastewater plumbing system.

Typically, the wastewater is provided to the inlet conduit 110 by gravity. However, depending on the installation location, the wastewater may be fed to the inlet with the assistance of a pump in addition to or alterative to a gravity feed.

Due to normal variations in use of a residential sewage system, the flow rate of the wastewater supplied to the system 100 typically changes over time. For example, in a typical residential installation, during times of low water usage, there may be little or no wastewater water produced and the input flow to the system 100 will be substantially zero. However, if the water usage is high, the amount of wastewater may also increase. For example, the input flow to the system 100 may reach a maximum flow condition if a bathtub, large sink, or washing machine is suddenly drained into the residential sewage system. In some cases, the maximum input flow rate may range from 10 to 20 gallons per minute. In some cases, the maximum flow rate is greater than 20 gallons per minute. In some cases, the maximum flow rate is less than 10 gallons per minute.

In system 100 depicted in FIGS. 1A and B, processing performed in the third 103 and fourth 104 chambers may be generally characterized as a second tier of processing. The flow of wastewater between the chambers of system 100 is provided by hydrostatic pressure and, as explained in more detail below, the water treatment process can be controlled using one or more passive flow ports to modulate fluid transfer between chambers. In some cases the flow rate of wastewater through the second tier processing is modulated to a flow rate between 1 and 15 gallons per minute. In some cases, the flow is modulated to a flow rate between 2 and 8 gallons per minute. In some cases, the flow is modulated to a flow rate between 4 and 6 gallons per minute.

In comparison, traditional septic tank systems transfer fluid between chambers typically without a restrictive flow control, resulting in processing chambers potentially becoming overloaded or flooded due to large variations in input flow rates. That is, to the extent that a traditional septic tank system includes, without limitation, multiple tiers of processing, an increase in the flow rate of the wastewater input will typically result in a corresponding increase in the flow rate of all of the processing chambers or tanks.

1. Multi-Chamber Wastewater Processing System

FIGS. 1A-B depict an exemplary six-chamber system 100 for processing residential wastewater. In a typical implementation, system 100 receives raw sewage from a building's sewage piping system and produces a clean water effluent by performing a series of wastewater treatment processes. In some cases, the clean water effluent produced by system 100 is suitable for human consumption. In other cases, the clean water produced is not suitable for drinking but is safe for irrigation or other environmental uses such as aquifer replenishment.

FIG. 1A depicts a plan view of the six-chamber system 100 including first chamber 101, second chamber 102, third chamber 103, fourth chamber 104, fifth chamber 105, and sixth chamber 106. The system 100 is configured to receive a flow of wastewater via input conduit 110. As previously mentioned, the flow of wastewater provided to the input conduit 110 may be determined by, for example, without limitation, the water usage of the building and has a flow rate that varies over time. The liquid provided to input conduit 110 typically includes, without limitation, a combination of water and biodegradable solids herein referred to as a wastewater mixture.

An initial stage of processing in system 100 occurs in the first chamber 101. In the first chamber 101, sludge and solids are broken up and the sludge is permitted to settle and the solids are permitted to float. In the first chamber 101, the wastewater mixture will begin initial stages of decomposition in suboxic conditions characterized by low oxygen and low sulfur content. In some cases, the wastewater mixture is at least partially decomposed through an ammonification process, which includes, without limitation, decomposing organic nitrogen proteins and peptides into ammonia and ammonium ions. In some cases, the decomposition of the wastewater mixture actually begins upstream of the input conduit 110 in, for example, without limitation, the pipes of the residential plumbing system. Chamber 101 is also configured to hold any non-degradable solids that may accumulate over a period of time, depending on system usage.

As part of the first tier of processing, the suboxic process of chamber 101 is able to accommodate normal variations in the input flow of wastewater without suffering significant degradation in process performance. For example, without limitation, processing in the first chamber 101 may accommodate input flow rates from 10 to 20 gallons per minute without significant performance degradation. In some cases, processing in the first chamber 101 may accommodate a flow rate greater than 20 gallons per minute without significant process depredation.

As shown in FIG. 1A, the second chamber 102 is adjacent to the first chamber 101 and is separated from the first chamber 101 by baffle wall 122. The partially processed wastewater from first chamber 101 flows to the second chamber 102. In this example, the partially processed wastewater flows into the second chamber 102 through a large port 121 in the baffle wall 122. The large port 121 is located near the vertical middle of the baffle wall 122, which allows liquid to pass between the chambers, while blocking sludge that has already settled to the bottom of the first chamber 101 and also block scum that has floated to the top. In this example, the flow of liquid between the first 101 and second 102 chambers is not substantially modulated or restricted. Accordingly, a flow of wastewater provided to system input 101 at an input flow rate will result in a substantially equal flow rate of liquid between the first chamber 101 and the second chamber 102.

For purposes of this discussion, the second chamber 102 is also characterized as part of the first tier of processing. Similar to the first chamber 101, the second chamber subjects the wastewater mixture to suboxic conditions. In the second chamber 102, the wastewater mixture is allowed to further settle and separate suspended solids. In some cases, heavier solids may tend to sink to the bottom of the chamber and lighter solids may tend to flocculate and float or remain in suspension.

As part of the first tier of processing, chamber 102 may also accommodate varied inflows of wastewater without suffering significant degradation in process performance. Specifically, the second chamber 102 can accommodate input flow rates from 1 to 20 gallons per minute. In some cases, the second chamber 102 can accommodate an input flow rate greater than 20 gallons per minute without significant depredation in process performance.

The further processed wastewater flows from the second chamber 102 to the third chamber 103. As shown in FIG. 1A, the third chamber 103 is separated from the second chamber 102 by an effluent baffle wall 124. In the present example, the third chamber 103 begins what can be characterized as second tier processing of the partially processed wastewater mixture. As discussed above, second tier processing may be more sensitive to changes in flow rate. The partially processed s wastewater mixture enters the third chamber 103 through an effluent flow port 123, which modulates the transfer of the wastewater between the chambers. The modulation provided by the effluent flow port 123 helps to isolate the second tier processes from variations in the input flow rate. To modulate the transfer of fluid, the effluent flow port 123 typically includes, without limitation, passive flow control elements, including one or more orifices. The effluent baffle wall 124 and an exemplary effluent flow port 123 are discussed in further detail below with respect to FIGS. 2A-B.

In this example, the wastewater in the third chamber 103 is subjected to aerobic digestion using a colony of nitrifying microorganisms (e.g., microorganisms of the *Nitrosomonas* and *Nitrobacter* genera). To promote the growth of nitrifying microorganisms, the third chamber 103 is aerated to enhance the oxygen content of the mixture. In this example, the third chamber 103 includes a membrane air diffuser connected to an air supply. The air supply may include, without limitation, a high-efficiency, low-pressure linear blower device. The air diffuser is configured to encourage oxygen transfer into the wastewater mixture in the third chamber 103 and to facilitate mixing of dissolved substrates and oxygen in the wastewater mixture.

Because the wastewater mixture in the third chamber 103 tends to be low in carbon and high in ammonia, the enhanced oxygen content provided by the aeration promotes the growth of the nitrifying microorganisms. In a typical process, the nitrifying microorganisms convert the ammonia into nitrates utilizing the oxygen in the wastewater. In particular, the ammonia is biologically removed in a two-step process: ammonia is oxidized to nitrite, and the nitrite is oxidized to nitrate. The nitrification process in the third chamber 103 may be affected by multiple factors including, for example, without limitation, detention time (i.e., the amount of time a volume of liquid is processed), dissolved oxygen content, and temperature. In the present example, processing in chamber 103 may be optimized for detention times greater than 12 hours, dissolved oxygen content greater than 6 mg/L, and temperatures between 28 and 31 degrees Celsius. Because these parameters depend, at least in part, on the rate that liquid that is introduced into the third chamber 103, acceptable processing conditions can be maintained by controlling the flow of wastewater into the third chamber 103.

The effluent flow port 123 helps maintain processing conditions by modulating the flow of wastewater into the third chamber 103. By modulating the amount of partially processed wastewater mixture that enters the third chamber 103, the detention time, concentration of dissolved oxygen, and temperature can be more easily maintained at optimal or near-optimal levels. In one example, the effluent flow port 123 modulates the flow to a rate between 1 and 15 gallons/minute. In some cases, the flow is modulated to a flow rate between 2 and 8 gallons per minute. In some cases, the flow is modulated to a flow rate between 4 and 6 gallons per minute.

From the third chamber 103, the partially processed wastewater flows into the fourth chamber 104 through a flow port 125 in the dividing baffle wall 126. As shown in FIG. 1A, the fourth chamber 104 is adjacent to the third chamber 103 and is separated from the third chamber 103 by the dividing baffle wall 126. In this example, the flow port 125 in the dividing baffle wall 126 does not substantially restrict the flow between the third 103 and fourth 104 chambers.

The fourth chamber 104 performs additional aerobic processing similar to the process described above with respect to the third chamber 103. For purposes of this discussion, the processing performed in the fourth chamber 104 can also be characterized as part of the second tier processing. Similar to the third chamber 103, the process conducted in the fourth chamber 104 may also be affected by multiple factors, including detention time, dissolved oxygen content, and temperature, which are at least partially dependent on the flow rate of wastewater into the fourth chamber 104. Thus, the effluent flow port 123 located upstream in the effluent baffle wall 124 can also be used to maintain acceptable processing conditions in the fourth chamber 104.

As a result of the processing performed on the first 101 through fourth 104 chambers, a substantially digested mixture is produced. In this example, the third 103 and fourth 104 chambers perform the majority of the aerobic processing on the wastewater mixture. In an alternative embodiment, a single chamber may be used to perform the majority of the aerobic processing. In another alterative embodiment, more than two chambers can be used to perform the majority of the aerobic processing to produce a substantially digested mixture.

As shown in FIG. 1A, the substantially digested mixture flows from the fourth chamber 104 into an adjacent fifth chamber 105 through a guarded flow port 127. As shown in FIG. 1A, the guarded flow port 127 is located in the baffle wall 128, which separates the fourth 104 and fifth 105 chambers.

In this example, clarification of the mixture is performed in the fifth chamber 105. In a typical process, some or all of the remaining solids in the mixtures settle to the bottom of the fifth chamber 105 as sludge. As the solids are allowed to settle in the fifth chamber, a volume of relatively clear liquid is produced. In many cases, it is desirable to maintain laminar flow conditions in the fifth chamber 105. For example, it is generally desirable to reduce turbulent currents and disruptive flows that may impede the settling of solids in the fifth chamber 105.

In the present example, the effluent flow port 123 helps to also modulate the flow of liquid into the fifth chamber 105. By modulating the flow that transfers into the upstream (third and fourth) chambers, the flow is also modulated as it is transferred into the fifth chamber 105. By modulating the flow into the fifth chamber, rapid transfer of the wastewater can be minimized or reduced. This helps to maintain the laminar flow conditions in the fifth chamber 105 by reducing or preventing disruptive flows or turbulent currents caused by a sudden inflow of liquid.

In addition, the guarded flow port 127 may further facilitate settling conditions in the fifth chamber 105. In some cases, the guarded flow port 127 may include, without limitation, a guard plate or weir guard that prevents solids or floating debris from entering the fifth chamber 105. The sudden introduction of solids or debris could also disrupt laminar flow conditions within the fifth chamber 105 and impede the settling process.

Additionally, the effluent flow port 123 in conjunction with the clarifier flow port 129 may work together to help maintain smooth laminar flow conditions in the fifth chamber 105. As discussed in more detail below, the clarifier flow port 129 may further modulate the flow of liquid through the system using one or more flow restricting elements to control the exit of liquid out of the fifth chamber. If the flow restriction caused by the clarifier flow port 129 is greater than the flow restriction caused by the effluent flow port 123, the upstream liquid will tend to pool in the upstream (third 103, fourth 104, and fifth 105) chambers. The result is a further reduction in the flow rate through the upstream (third 103, fourth 104, and fifth 105) chambers and also helps to facilitate laminar flow conditions in the fifth chamber 105.

Clarified wastewater in the fifth chamber 105 flows into the sixth chamber 106, which serves as a water storage tank. The water is transferred between the fifth 105 and sixth 106 tanks through the clarifier flow port 129 in output baffle wall 130. While the primary purpose of the sixth chamber 106 is to temporarily store water, further settling of some or all of any remaining solids may also occur in the sixth chamber 106. Accordingly, it is generally desirable to maintain near-quiescent conditions in the sixth chamber 106.

As previously mentioned, the clarifier flow port 129 may be configured modulate the flow into the sixth chamber 106. By modulating the flow into the sixth chamber 106, the clarifier flow port may reduce disruptive flows or turbulent currents, and thereby facilitate near-quiescent conditions in the sixth chamber 106. In particular, the clarifier flow port 129 prevents rapid fluid transfer into the sixth chamber 106, which reduces the disruptive effects that could be caused by sudden inflow of liquid. The output baffle wall 130 and the effluent flow port 129 are discussed in further detail below with reference to FIGS. 3A-B.

The output of system 100 is clear water that is sufficiently clean for many domestic or industrial uses. In some cases, the resulting effluent produced by system 100 is sufficiently processed for safe use in irrigation, such as through subsurface drip fields or the like. As shown in FIG. 1B, water can be removed from the sixth chamber 106 through water a pipe 112 and a water pump. The water in the sixth chamber 106 may also be removed by gravity or syphon, depending on the location of the system with respect to the location of the output of the water pipe 112. The extracted water can then be directed to a drip field irrigation system or other application.

As shown in FIG. 1B, liquid may also be recirculated between chambers using a recirculation pipe 114. In this example, settled solids or sludge can be recirculated from the bottom of the fifth chamber 105 into the first chamber 101. In some practical embodiments, the process may use a large air bubble in a tube that essentially creates negative pressure to lift the sludge behind it as the bubble rises.

The flow rate through each of the six chambers is configured to optimize detention time to allow waste to be more completely decomposed. One metric of water cleanliness may include, without limitation, biochemical oxygen demand ("BOD"). Typical wastewater treatment systems are required to produce an effluent with a BOD of 30 mg/L or less. Drinking water typically has a BOD of around 2 mg/L, while acceptable in-ground irrigation water has a BOD of around 45 mg/L. The system described herein is configured, for example, without limitation, to output an effluent with a BOD of less than 10 mg/L.

Although a six-chamber system is described, it should be appreciated that many variations are also contemplated that are intended to be included within the scope of this disclosure. Systems with different numbers of chambers, different arrangements of successive chambers, different flow port shapes, different flow port sizes, and the like can all benefit from the novel teachings of this disclosure to achieve more efficient and effective wastewater processing.

2. Effluent Flow Port

In a traditional building sewage system, it may not be uncommon for large volumes of liquid be produced and enter a wastewater treatment system. For example, a large volume of wastewater may be transferred into a wastewater treatment system due to the draining of bathtub water, the completion of a clothes washer cycle, or other activity that produces a significant amount of wastewater. In some traditional septic tanks systems, a sudden, large volume of inflow may cause wastewater to flow more rapidly through the entire system. However, many wastewater treatment processes require a minimum amount of time to perform sufficient breakdown and/or digestion of organic materials. Thus, in some traditional septic tank systems, a large inflow of liquid may flush wastewater through the entire system, which may result in an effluent output that has not been sufficiently processed.

To address this issue with some traditional systems, the flow rate of wastewater can be controlled allow sufficient detention time (i.e., the amount of time a volume of liquid is processed) in the various treatment stages to more effectively and consistently produce a safe effluent. As described above with respect to FIGS. 1A-B, an effluent flow port 123 can be used to modulate flow into and through portions of a water treatment system 100. In the present example, the effluent flow port 123 is located in the effluent baffle wall 124 that separates the second 102 and third 103 chambers. The effluent flow port 123 helps maintain processing conditions by restricting the flow of wastewater into downstream wastewater processing stages and isolating those downstream stages from variations in system input flow. By modulating the amount of liquid that enters the downstream chambers, the detention time, concentration of dissolved oxygen, and temperature of downstream processes can be maintained at acceptable levels.

Figure 2A:
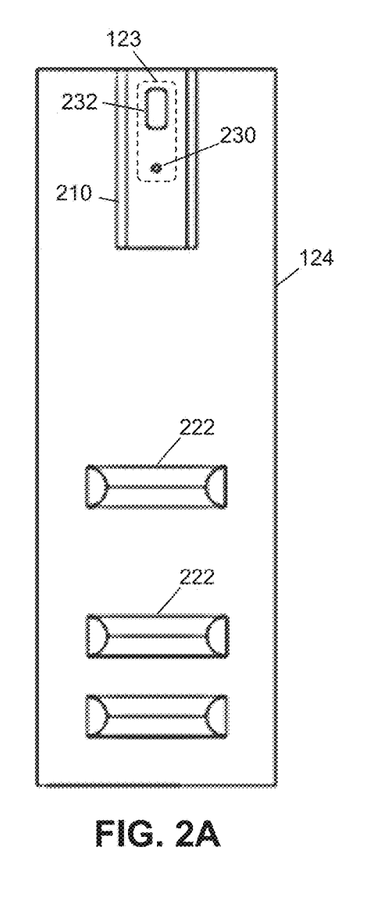
FIGS. 2A-B depict an exemplary effluent baffle wall including an effluent flow port.
Figure 2B:
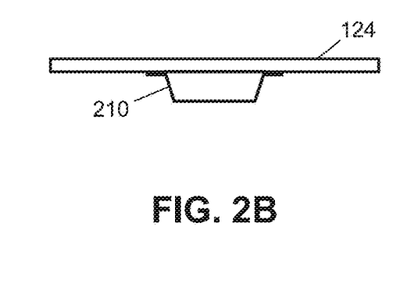

FIGS. 2A-B depict the effluent baffle wall 124 and an exemplary effluent flow port 123 without other elements of the wastewater treatment system 100. FIG. 2A depicts a front view of the effluent baffle wall 124 as viewed from the side facing the second chamber 102 (depicted in FIG. 1A). FIG. 2B depicts a top view of the effluent baffle wall 124 as viewed from the top of the wastewater treatment system 100 (depicted in the elevation view of FIG. 1B).

The effluent flow port 123 depicted in FIG. 2A can be used to modulate the flow into and through downstream processes using a passive, two-stage flow control. As shown in FIG. 2A, the two-stage flow control is provided by two orifices: a lower, first orifice 230 and a second, upper orifice 232. In this example, the first stage of flow control is active when the fluid level in the second chamber 102 is above the first orifice 230 and below the second orifice 232. The second stage of flow control is active when the fluid level in the second chamber 102 is at the second orifice 232.

The first stage of flow control governed by the first orifice 230 produces a first modulated flow having a first flow rate. Typically, the first flow rate is less than a maximum input flow rate, which may be determined, in part, by the diameter of the conduit used in the sewage system (e.g., 2-½ inch diameter sewage pipes). In some cases, the maximum input flow rate is determined by other flow limiting elements in the sewage system. In the current example, the first flow rate produced by the first orifice 230 results in a steady flow of wastewater through downstream chambers 103 and 104 and provides a baseline detention time in the corresponding treatment processes. Depending on other processing parameters such as microbe population, oxygen content, and biomass concentration, the baseline detention time may correspond to an optimal detention time for the wastewater treatment system.

In this example, the lower, first orifice 230 is formed from a circular hole having a diameter of approximately ¾ inch. In this example, the size of the first orifice 230 is important to the operation of the wastewater treatment system 100. Depending on the application, the first orifice 230 may have a diameter that is equal to or greater than approximately ¼ inch. Because there is typically a significant amount of bio mass and debris in the wastewater mixture, a circular orifice having a diameter significantly less than ¼ inch may tend to clog. The first orifice 230 may also have a diameter that is equal to or less than approximately 1 inch. In some cases, a circular orifice having a diameter significantly greater than 1 inch may not provide sufficient flow control, resulting in the wastewater being transferred through the wastewater treatment system at a rate that is too high to achieve baseline or optimal processing conditions. In one example, the first stage of the effluent flow port 123 modulates the flow to a rate between 1 and 8 gallons/minute. In some cases, the flow is modulated to a flow rate between 4 and 6 gallons per minute.

The second stage of flow control, governed by the first 230 and second 232 orifices. The second orifice 232 produces a second modulated flow having a second flow rate. Together, the first 230 and second 232 orifices produce a combined (effluent) flow rate that is the sum of the first and second flow rates. Typically, the combined flow rate is also less than a maximum input flow rate, determined by one or more elements of a building's sewage system. In the current example, the combined flow rate also produces steady flow of wastewater through downstream chambers 103 and 104 resulting in an accelerated detention time in the corresponding treatment processes. Depending on other processing parameters such as microbe population, oxygen content, and biomass concentration, the accelerated detention time may correspond to the minimum acceptable detention time for the wastewater treatment system.

In this example, the upper, second orifice 232 is formed from a rectangular hole having a width of approximately 2 inches and a height of approximately 4 inches. The size of the second orifice 232 is also critical to the operation of the wastewater treatment system 100. Depending on the application, the second orifice 232 may have height and width that is equal to or greater than approximately 1 inch (or an area of approximately 1 square inch). Because the wastewater treatment system 100 must be able to accommodate heavy water use conditions, a second orifice that is significantly smaller than 1 inch in height and width may overly restrict the flow and cause a backup condition during normal, heavy water use conditions. The second orifice 232 may also have a width that is equal to or less than approximately 2-½ inches and a height that is equal to or less than approximately 4-½ inches (or an area of approximately 12 square inches). In some cases, a second orifice having dimensions significantly greater than this may not provide sufficient flow control, resulting in the wastewater being transferred through the wastewater treatment system at a rate that is too high to achieve minimum acceptable processing conditions. In one example, second stage of the effluent flow port 123 modulates the flow to a rate between 4 and 15 gallons/minute. In some cases, the flow is modulated to a flow rate between 6 and 10 gallons per minute.

One potential benefit of the effluent flow port 123 is the modulation of the thermal profile of wastewater treatment system 100. In general, flowing wastewater too quickly into downstream aerobic processing chambers (e.g., third 103 and fourth 104 chambers depicted in FIGS. 1A-B) may over-feed microbe colonies in those portions of the system. Over-feeding the microbes may result in an in an undesirable spike in thermal generation, which may damage or destroy the microbe colony. Thus, modulating the flow of wastewater into aerobic processing chambers may provide a more consistent food source for the microbes and result in an acceptable thermal profile of the wastewater treatment system 100.

Modulating the flow with the effluent flow port 123 also modulates the fluid density of various chambers. In particular, by modulating the flow of liquid from upstream chambers in the first tier of processing, mass transfer from upstream chambers is also modulated, which allows for fluid densities in the various chambers that are preferable for efficient wastewater processing.

Modulating the flow with the effluent flow port 123 may also help modulate processes in chambers that are downstream of the third 103 and fourth 104 chambers. For example, without limitation, by modulating the flow through the third 103 and fourth 104 chambers, de-nitrification processes occurring in the fifth 105 and sixth 106 chambers may also be modulated. In particular, by providing a modulated or consistent detention time in the third 103 and fourth 104 chambers, the oxygen absorption in those chambers may tend to also be consistent, which helps to modulate the suboxic de-nitrification processes occurring in the fifth 105 and sixth 106 chambers.

The passive, two-stage flow control of the effluent flow port 123 depicted in FIG. 2A also accommodates normal variations in input flow without creating a sewage back up at the system inlet. In some cases, the first flow rate produced by the lower, first orifice 230 is too low to accommodate normal variations in the input flow. In this case, the second stage, using the first 230 and second 232 orifices allows for an increased (second) flow rate to provide an increased processing capacity while still maintaining acceptable detention times in downstream processes. In this example, the upper, second orifice 232 is positioned approximately two inches above the lower, first orifice 230, thereby providing extra capacity in the upstream chambers. Based on the geometry of the upstream first 101 and second 102 chamber in this example, a two-inch separation between the first 230 and second 232 orifices provides approximately 50 gallons (or approximately 5% by volume) of extra capacity in the upstream chambers. In some cases, a two-inch separation provides approximately 100 gallons (or approximately 10% by volume) of extra capacity in the upstream chambers. In some cases, the separation distance provides at least 3% of extra capacity, by volume. Because the capacity created by the separation between the orifices is largely dependent on the geometry of the upstream chambers, the separation distance may vary depending on the design of the wastewater treatment system.

Modulating the flow using the effluent flow port 123 typically results in improved performance as compared to traditional septic tank systems. For example, without limitation, the first stage of the effluent flow port 123 may result in a detention time that is significantly increased over traditional systems that use, for example, without limitation, sanitary tee joints or cascading waterfall connections between chambers. A traditional septic tank system may operate on an 8-12 hour detention time based, at least in part, on the direct correlation between system inflow and the corresponding downstream flow from chamber to chamber. In contrast, the first stage of the effluent flow port 123 may provide 24-48 hours of detention time for the first tier of processing, thereby allowing more complete wastewater processing than a traditional septic tank system.

In this example, the effluent flow port 123 is located near the top of the effluent baffle wall 124. Because liquid cannot exit the second chamber 102 until it reaches the effluent flow port 123, the height of the effluent flow port 123 along the effluent baffle wall 124 determines how much wastewater is allowed to accumulate in the in the first 101 and second 102 chambers. In the current example, the effluent flow port 123 is located approximately 54 inches from the bottom of the effluent baffle wall 124 to provide for an accumulation of approximately 780 gallons in the first 101 and second 102 chambers.

One of skill in the art will appreciate that the height of effluent flow port 123 on baffle wall 124 with respect to other flow control elements at least partially determines the capacity of various chambers in the system as well as the amount and rate of flow given a certain system load. Accordingly, the size and position of orifices 230 and 232 in FIG. 2A are provided as an illustrative example with modifications readily apparent for different system arrangements and different design preferences.

As depicted in FIGS. 2A-B, baffle wall 124 also includes, without limitation, a weir guard or guard plate 210 on the upstream side. Weir guard or guard plate 210 helps prevent clogging of effluent flow port 123, including orifices 230 and 232, by blocking floating solids and froth from the immediate vicinity of the orifices. Weir guard or guard plate 210 is attached to the baffle wall 124 with tabs or flanges to form a seal along the side edges. The weir guard or guard plate 210 is also offset away from baffle wall 124 to leave open top and bottom passages to allow fluid into the area. As illustrated in FIG. 2A, weir guard or guard plate 210 extends well below small lower orifice 230 to ensure protection from solids and froth floating on the surface of the wastewater in the upstream chamber.

Also, as depicted in FIGS. 2A-B, the baffle wall 124 includes, without limitation, multiple stiffener ribs 222 to provide structural support. In the current example, the baffle wall 224 is formed from a sheet of material. In alternative embodiments, the baffle wall 224 may be formed from a box or composite structure to provide the necessary structural support.

3. Clarifier Flow Port

As described above, the flow through a wastewater treatment system may be further modulated using a clarifier flow port. In particular, a clarifier flow port may restrict the flow out of portions of the wastewater treatment system, further reducing the flow of liquid through the system. Flow modulation caused by the clarifier flow port may also help maintain quiescent conditions in the final storage chamber of the wastewater treatment system.

Figure 3A:
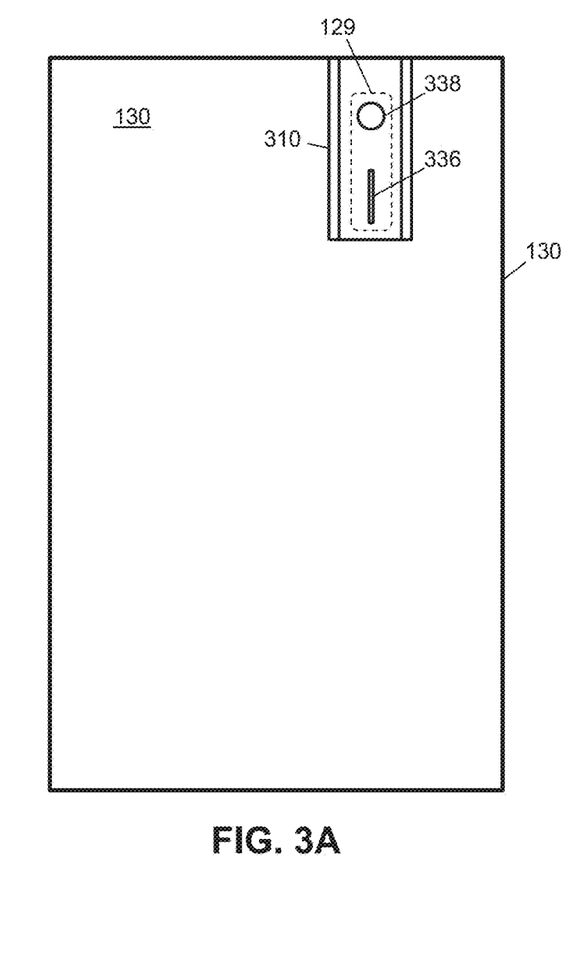
FIGS. 3A-B depict an exemplary output baffle wall including a clarifier flow port.
Figure 3B:
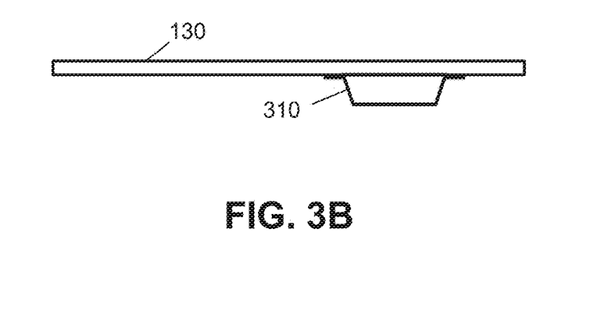

FIG. 3A depicts the output baffle wall 130 and clarifier flow port 129 without other elements of the wastewater treatment system 100 (depicted in FIGS. 1A-B). FIG. 3A depicts a front view of the output baffle wall 130, as viewed from the side facing the fifth chamber 105 (depicted in FIG. 1A). FIG. 3B depicts a top view of the output baffle wall 130 as viewed from the top of the wastewater treatment system 100 (depicted in the elevation view of FIG. 1B).

The clarifier flow port 129 depicted in FIG. 3A can be used to modulate the flow using a passive, two-stage flow control. As shown in FIG. 3A, the two-stage flow control is provided by two orifices: a lower, first orifice 336 and a second, upper orifice 338. In this example, the first stage of flow control is active when the fluid level in the fifth chamber 105 is above the first orifice 336 and below the second orifice 338. The second stage of flow control is active when the fluid level in the fifth chamber 105 is above the second orifice 338.

The first stage of flow control governed by the first orifice 336 produces a first modulated flow having a first flow rate. Typically, the first flow rate is less than a first modulated flow rate, which may be determined, in part, by the effluent flow port 123, discussed above. In the current example, the first flow rate produced by the first orifice 336 results in a restricted flow of wastewater into the sixth chamber 106. By restricting the flow of clarified water into the sixth chamber 106, the presence of disruptive flows and/or turbulent currents caused by transferred liquid may be reduced or eliminated.

Additionally, the first orifice 336 is configured to provide a progressively increasing flow into the sixth chamber 106, as the liquid level rises in the upstream, fifth chamber 105. The progressively increasing flow helps to reduce the backup of liquid upstream of the clarifier flow port 129, while still minimizing disruptive flows and turbulent currents. In this example, the flow through the first orifice 336 becomes progressively less restricted as the liquid level rises in the fifth chamber 105. This is accomplished with an orifice shaped like a rectangular slot. Other geometries, including, for example, without limitation, a plurality of circular orifices arranged vertically along the output wall 130, may also be used to provide a progressively increasing flow.

In this example, the lower, first orifice 336 is formed from a rectangular slide having a width of approximately ⅜ inch and a height of approximately 4 inches. The size of the first orifice 336 may be important to the operation of the wastewater treatment system 100. Depending on the application, the first orifice 336 may have a width that is equal to or greater than approximately ¼ inch. Because there may still be some remaining bio mass and/or debris in the wastewater mixture, a first orifice 336 having a width significantly less than ¼ inch may tend to clog. The first orifice 336 may also have a width that is equal to or less than approximately ½ inch. In some cases, a first orifice 336 having a width significantly greater than ½ inch may not provide sufficient flow control. In some cases, insufficient flow control will result in too much liquid entering the sixth chamber 106 at once, causing stirring or turbulent currents in the tank. Additionally, if the clarifier flow port 129 is being used to further modulate the upstream flow (in the third 103, fourth 104, and fifth 105 chambers), insufficient flow control may result in the wastewater being transferred through the wastewater treatment system at a rate that is too high to achieve baseline or optimal processing conditions. In one example, the first stage of the clarifier flow port 129 modulates the flow to a rate between 1 and 3 gallons/minute.

In the current example, the first stage of flow control is determined by a first orifice 336 formed from a single slit opening as shown in FIG. 3A. As previously mentioned, in alternative embodiments, the first stage of flow control may be determined by a plurality of small, circular orifices arranged vertically along the output baffle wall 130. One of skill in the art will appreciate that a variety of orifice geometries could be used to achieve the same result as the example provided above with respect to FIG. 3A.

The second stage of flow control, governed by the first 336 and second 338 orifices. The second orifice 338 produces a second modulated flow having a second flow rate. Together, the first 336 and second 338 orifices produce a combined (clarifier) flow rate that is the sum of the first and second flow rates. Typically, the combined flow rate is also less a first modulated flow rate determined, in part, by the effluent flow port 123, discussed above. In the current example, the combined flow rate also produces a restricted flow of wastewater into the sixth chamber 106. Additionally, if the clarifier flow port 129 is being used to further modulate the upstream flow (in the third 103 and fourth 104 chambers), the combined (clarifier) flow rate may be sufficient to maintain acceptable detention times in upstream chamber processing.

In this example, the upper, second orifice 338 is formed from a circular hole having a diameter of approximately 2 inches. Depending on the application, the second orifice 338 may have diameter that is equal to or greater than approximately 1 inch. Because the wastewater treatment system 100 must be able to accommodate heavy water use conditions, a second orifice that is significantly smaller than 1 inch in diameter may overly restrict the flow and cause a backup condition during normal, heavy water use conditions. The second orifice 338 may also have a diameter that is equal to or less than approximately 2-¼ inches. In some cases, a second orifice 338 having dimensions that significantly greater than this may not provide sufficient flow control, resulting in the wastewater being transferred through the wastewater treatment system at a rate that is too high to achieve minimum acceptable processing conditions. In one example, second stage of the clarifier flow port 129 modulates the flow to a rate between 1 and 10 gallons/minute. In some cases, the flow is modulated to a flow rate between 2 and 8 gallons per minute. In some cases, the flow is modulated to a flow rate between 4 and 6 gallons per minute.

The passive, two-stage flow control of the clarifier flow port 129 depicted in FIG. 3A also accommodates normal variations in input flow without creating a sewage back up in the wastewater treatment system. In some cases, the first flow rate produced by the lower, first orifice 336 is too low to accommodate normal variations in the first modulated flow. In this case, the second stage, using the first 336 and second 338 orifices, allows for an increased (second) flow rate to provide an increased processing capacity while still maintaining acceptable detention times in upstream processes. In this example, the upper, second orifice 338 is positioned approximately two inches above lower, first orifice 338, thereby providing extra capacity in the upstream chambers. Based on the geometry of the upstream first, 101, second 202, third 103, fourth 104, and fifth 105 chambers in this example, a two-inch separation between the first 336 and second 338 orifices provides approximately 120 gallons of extra capacity in the upstream chambers. Because the capacity created by the separation between the orifices is largely dependent on the geometry of the upstream chambers, the separation distance may vary depending on the design of the wastewater treatment system.

One of skill in the art will appreciate that the height of clarifier flow port 129 on baffle wall 130 with respect to other flow control elements at least partially determines the capacity of various chambers in the system as well as the amount and rate of flow given a certain system load. Accordingly, the size and positioning of orifices 336 and 338 in FIG. 3A are provided as an illustrative example with modifications readily apparent for different system arrangements and different design preferences.

As mentioned above, and as illustrated in FIGS. 3A and 3B, baffle wall 130 incorporates weir guard or guard plate 310 on the upstream side to protect clarifier flow port 129 from floating solids or froth that may clog the orifices. The weir guard or guard plate 310 is attached to baffle wall 130 with tabs or flanges to form a seal along the side edges, while being offset away from baffle wall 130 to leave open top and bottom passages to allow liquid into the area near clarifier flow port 129.

4. Exemplary Processes for Modulating Flow in a Wastewater Treatment System

Figure 4A:
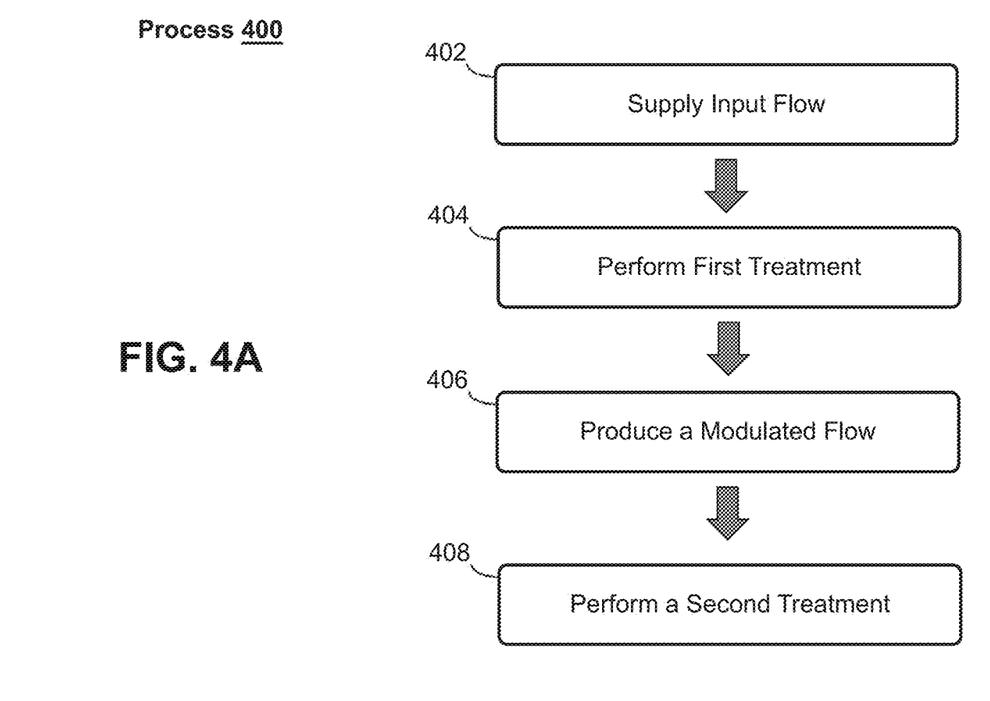
FIG. 4A depicts an exemplary process for modulating wastewater flow using an effluent flow port.
Figure 4B:
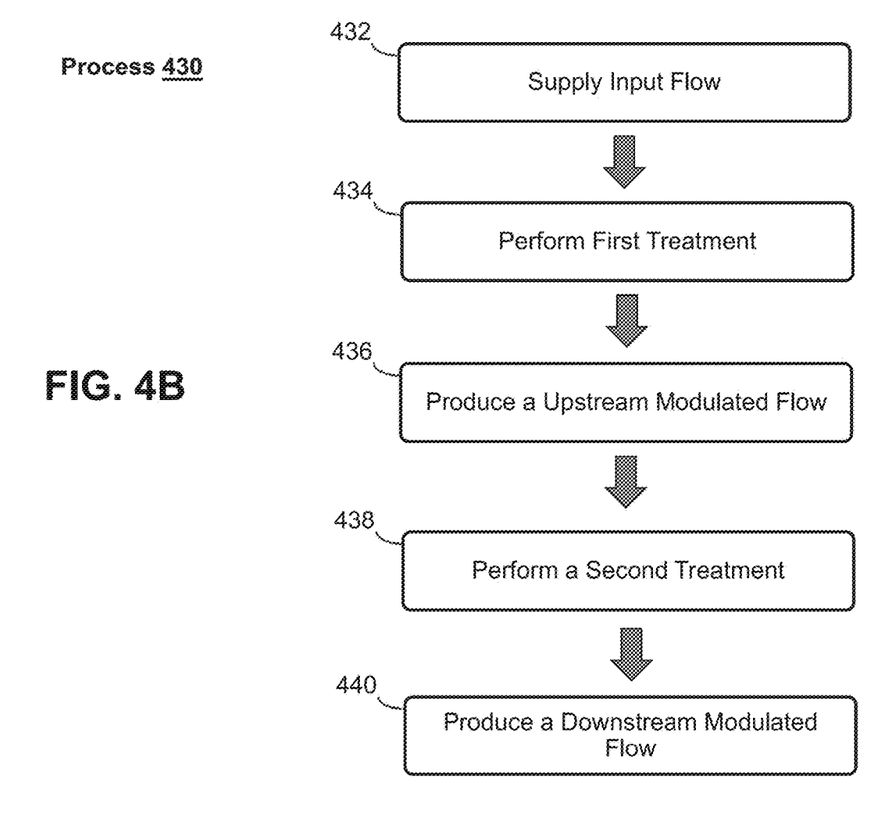
FIG. 4B depicts an exemplary process for modulating wastewater flow using a clarifier flow port.

FIGS. 4A-B depict exemplary processes for modulating wastewater flow using one or more flow ports. The exemplary processes can be used as part of a wastewater treatment processes to produce a clean water effluent. Typically, the processes of FIGS. 4A-B are performed at or near a sewage source site to produce a clean water effluent that can be used for irrigation or other purposes.

In operation 402, an input flow of a wastewater mixture is supplied to an upstream chamber in the multi-chamber system. Typically, the input flow is supplied by an output of a building's sewage piping system. As discussed above, the flow rate provided by such a sewage piping system may be variable due to variable water usage conditions. The sewage system may be limited to a maximum input flow rate due to the size of the pipes used in the sewage system or due to another flow limited device or feature. With reference to FIG. 1A, the wastewater mixture may be supplied to the second 102 chambers via the input conduit 110 and the first chamber 101. In other examples, upstream chamber may receive an input flow of wastewater directly from an input conduit (without an intermediate chamber).

In operation 404, a first treatment is performed on the wastewater mixture to produce a partially processed mixture. In one example, the first treatment is an ammonification treatment conducted in suboxic conditions. An exemplary treatment is described above with respect to the first 101 and second 102 chambers of FIG. 1A. In some cases, the partially processed mixture is a result of at least some of the solids being settled to the bottom of one or more chambers. In some cases, the partially processed mixture includes, without limitation, solids that have become flocculated and float or remain in suspension in the liquid.

In operation 406, a modulated flow of the partially processed mixture is produced using an effluent flow port. The effluent flow port provides the modulated flow to a downstream chamber of the multi-chamber system. With reference to FIG. 1A, the effluent flow port 123 provides a modulated flow from the second chamber 102 (exemplary upstream chamber) to the third chamber 103 (exemplary downstream chamber). A more detailed description of an exemplary effluent flow port is provided above with respect to FIGS. 2A-B.

As described above, the effluent flow port may provide a two stage modulated flow using two orifices. A first orifice may be configured to produce a first modulated flow having a first flow rate. Typically, the first flow rate is less than the maximum input flow rate. A second orifice of the effluent flow port may be configured to produce a second modulated flow having a second flow rate. Typically, the second flow rate is also less than the maximum input flow rate. In some cases, a combined flow rate including the first and second flow rates is less than the maximum input flow rate. In some cases, the first flow rate is between 1 and 8 gallons per minute and the second flow rate is between 4 and 15 gallons per minute. In other cases, the first flow rate is between 4 and 6 gallons per minute and the second flow rate is between 6 and 10 gallons per minute.

In operation 408, a second treatment is performed on the wastewater mixture to produce a substantially digested mixture. In one example, the second treatment is a nitrification treatment conducted in aerobic conditions. An exemplary treatment is described above with respect to the third 103 and fourth 104 chambers of FIG. 1A. The second treatment may also include, without limitation, one or more biological treatment steps to remove solids from the mixture. The quality of the second treatment may depend on multiple parameters including, for example, without limitation, detention time, concentration, oxygen content, and temperature. As described above, an effluent flow port may help regulate these parameters by modulating the flow of wastewater into and through chambers performing part or all of the second treatment.

FIG. 4B depicts an exemplary process 430 for treating wastewater using a multi-chamber treatment system. Process 430 can be performed using the exemplary system 100 discussed above with respect to FIGS. 1A-B. In the following example, process 430 performs a wastewater treatment by modulating a flow of the wastewater using a clarifier flow port.

In operation 432, an input flow of a wastewater mixture is supplied to an upstream chamber in the multi-chamber system. As described above with respect of operation 402, the input flow is supplied by an output of a sewage piping system and may be variable due to variable water usage conditions inside the building. With reference to FIG. 1A, the wastewater mixture may be supplied to the second 102 chambers via the input conduit 110 and the first chamber 101. In other examples, upstream chamber may receive an input flow of wastewater directly from an input conduit (without an intermediate chamber).

In operation 434, a first treatment is performed on the wastewater mixture to produce a partially processed mixture. In one example, the first treatment is an ammonification treatment conducted in suboxic conditions. An exemplary treatment is described above with respect to the first 101 and second 102 chambers of FIG. 1A.

In operation 436, an upstream modulated flow of the partially processed mixture is produced. In some cases, the upstream modulated flow is produced using an effluent flow port. The upstream modulated flow may be provided to a downstream or middle chamber of the multi-chamber system. With reference to FIG. 1A, the effluent flow port 123 provides an upstream modulated flow from the second chamber 102 (exemplary upstream chamber) to the third chamber 103 (exemplary first downstream or middle chamber). The third 103 or fourth 104 chambers may also be characterized as downstream or middle chambers. A more detailed description of an exemplary effluent flow port is provided above with respect to FIGS. 2A-B.

In operation 438, a second treatment is performed on the wastewater mixture to produce a substantially digested mixture. In one example, the second treatment is a nitrification treatment conducted in aerobic conditions. An exemplary treatment is described above with respect to the third 103 and fourth 104 chambers of FIG. 1A. The second treatment may also include, without limitation, one or more biological treatment steps to remove solids from the mixture. For example, the second treatment may include, without limitation, settling that is performed in the clarification fifth chamber 105 of FIGS. 1A-B. In some cases, the substantially digested mixture has a BOD of 30 mg/L or less. In some cases, the substantially digested mixture has a BOD of 10 mg/L or less. In some cases, the substantially digested mixture has a BOD of 2 mg/L or less, which may be suitable as drinking water.

The quality of the second treatment may depend on multiple parameters including, for example, without limitation, detention time, concentration, oxygen content, and temperature. As described above, an effluent flow port may help regulate these parameters by modulating the flow of wastewater into and through chambers performing part or all of the second treatment. Additionally, the clarifier flow port may also help to regulate these parameter by further modulating the flow of wastewater creating a pooling or slowing of flow through the downstream or middle chambers.

In operation 440, a downstream modulated flow of the substantially digested mixture is produced using a clarifier flow port. The downstream modulated flow may be provided to a second downstream chamber of the multi-chamber system. With reference to FIG. 1A, the clarifier flow port 129 provides a downstream modulated flow from the fifth chamber 105 (exemplary middle or first downstream chamber) to the sixth chamber 106 (exemplary second downstream chamber). A more detailed description of an exemplary clarifier flow port is provided above with respect to FIGS. 3A-B.

As described above, the clarifier flow port may provide a two stage modulated flow using two orifices. A first, lower orifice may be configured to produce a first modulated flow having a first flow rate. Typically, the first flow rate is less than an upstream flow rate of the upstream modulated flow. A second, upper orifice of the clarifier flow port may be configured to produce a second modulated flow having a second flow rate. Typically, the second flow rate is also less than the upstream flow rate. In some cases, a combined flow rate including the first and second flow rates is less than the upstream flow rate. In some cases, the combined flow rate is between 1 and 10 gallons/minute. In some cases, the combined flow rate is between 2 and 8 gallons per minute. In some cases, the combined flow rate is between 4 and 6 gallons per minute.

Although only certain exemplary embodiments have been described in detail above, those skilled in the art will readily appreciate that many modifications are possible in the exemplary embodiments without materially departing from the novel teachings and advantages of this disclosure. For example, aspects of embodiments disclosed above can be combined in other combinations to form additional embodiments. Accordingly, all such modifications are intended to be included within the scope of this disclosure.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. Thus, the present invention is not limited to any particular tangible means of implementation.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112 (6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing a system and method of treating wastewater according to the present invention will be apparent to those skilled in the art. Various aspects of the invention have been described above by way of illustration, and the specific embodiments disclosed are not intended to limit the invention to the particular forms disclosed. The particular implementation of the system and method of treating wastewater may vary depending upon the particular context or application. By way of example, and not limitation, the system and method of treating wastewater described in the foregoing were principally directed to individual building implementations; however, similar techniques may instead be applied to municipal plants, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objectives, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:
1. A system comprising:
an upstream chamber being configured to receive a variable input flow of a wastewater mixture, the variable input flow having a maximum input flow rate;
a middle chamber adjacent to the upstream chamber;
an effluent baffle wall separating the middle chamber from the upstream chamber;
an effluent flow port located in the effluent baffle wall, wherein the effluent flow port comprises:
a first orifice being configured to produce a first modulated flow of the wastewater mixture from the upstream chamber to the middle chamber, the first modulated flow having a first flow rate; and
a second orifice being positioned above the first orifice, wherein the second orifice is configured to produce a second modulated flow having a second flow rate, wherein a combined effluent flow rate including the first and second flow rates is less than the maximum input flow rate;
a first downstream chamber being configured to receive the first modulated flow of the wastewater mixture from the middle chamber;
a second downstream chamber adjacent to the first downstream chamber;
an output baffle wall separating the second downstream chamber from the first downstream chamber; and
a clarifier flow port located in the output baffle wall, wherein the clarifier flow port comprises:
a third orifice being configured to produce a third modulated flow of the wastewater mixture from the first downstream chamber to the second downstream chamber, wherein a third flow rate of the third modulated flow is less than the combined effluent flow rate; and
a fourth orifice being positioned above the third orifice, wherein the fourth orifice is configured to produce a fourth modulated flow.
2. The system of claim 1, wherein a combined clarifier flow rate including a fourth flow rate of the fourth modulated flow and the third flow rate is less than the combined effluent flow rate.

3. A method comprising:

supplying an input flow of a wastewater mixture to an upstream chamber, the input flow having a variable flow rate with a maximum input flow rate;

performing a first treatment on the wastewater mixture to produce a partially processed mixture;

producing a first modulated flow of the partially processed mixture from the upstream chamber to a middle chamber using an effluent flow port, wherein the effluent flow port comprises:

a first orifice being configured to produce the first modulated flow having a first flow rate; and a second orifice being positioned above the first orifice, wherein the second orifice is configured to produce a second modulated flow having a second flow rate, wherein a combined effluent flow rate including the first and second flow rates is less than the maximum input flow rate;

performing a second treatment on the partially processed mixture to produce a substantially digested mixture; and producing a third modulated flow of the substantially digested mixture from the first downstream chamber to a second downstream chamber using a clarifier flow port, wherein the clarifier flow port comprises:

a third orifice being configured to produce the third modulated flow having a third flow rate that is less than the combined effluent flow rate; and a fourth orifice being positioned above the third orifice, wherein the fourth orifice is configured to produce a fourth modulated flow.

4. The method of claim 3, wherein a combined clarifier flow rate including the third flow rate and a fourth flow rate of the fourth modulated flow is less than the combined effluent flow rate.

5. The method of claim 3, wherein the first treatment is an ammonification treatment in suboxic conditions.

6. The method of claim 3, wherein the second treatment is a nitrification treatment in aerobic conditions.

* * * * *